United States Patent [19]
Kumagai

[11] Patent Number: 5,296,700
[45] Date of Patent: Mar. 22, 1994

[54] FLUORESCENT CONFOCAL MICROSCOPE WITH CHROMATIC ABERRATION COMPENSATION

[75] Inventor: Satoru Kumagai, Kanagawa, Japan
[73] Assignee: Nikon Corporation, Tokyo, Japan
[21] Appl. No.: 942,713
[22] Filed: Sep. 9, 1992
[30] Foreign Application Priority Data
  Sep. 12, 1991 [JP] Japan .................. 3-260488
[51] Int. Cl.⁵ .............................................. H01J 3/14
[52] U.S. Cl. ................................ 250/216; 359/368
[58] Field of Search ............... 250/216, 234, 235, 236, 250/458.1, 461.2; 356/318; 359/368, 397

[56] References Cited
U.S. PATENT DOCUMENTS
5,034,613  7/1991  Denk et al. .................... 356/318
5,120,953  6/1992  Harris .......................... 250/216

Primary Examiner—David C. Nelms
Attorney, Agent, or Firm—Michael N. Meller

[57] ABSTRACT

A fluorescent confocal microscope designed for the improvement of optical cutting function and lateral resolution and the improvement of the accuracy of quantitative measurement for a wide visual field. An intermediary optical system, which is arranged between a pair of scanner mirrors and an objective optical system (a pupil projection lens and an objective lens), is of a retrofocustype construction and it has chromatic aberration of magnification tending to cancel chromatic aberration of magnification of the objective optical system for wavelengths of excitation light and fluorescent light. The pupil of the objective lens is relayed to the vicinity of the scanner mirrors by the pupil projection lens and the intermediary optical system. In this case, a pupil magnification $\beta_p$ is selected to satisfy an expression $|\beta_p| \leq 1$.

5 Claims, 5 Drawing Sheets

FLUORESCENT CONFOCAL MICROSCOPE WITH CHROMATIC ABERRATION COMPENSATION

BACKGROUND OF THE INVENTION

1. Field of the Invention

The present invention relates to a fluorescent confocal microscope so designed that the surface of a specimen is scanned by an excitation light whereby the resulting fluorescent light emanating from the specimen is condensed on each of pinholes and the fluorescent light passed through the pinholes is detected, thereby selectively obtaining only focusing information.

2. Related Background Art

With a conventional fluorescent confocal microscope, a microscope objective lens compensated for changes in the chromatic aberration of magnification for purpose of the ordinary observation with the naked eye or a television camera is employed as its objective lens.

In the past, while, in the case of the system of a microscope objective lens unit, the composite system of a microscope objective lens and an eyepiece according to the compensation method and the like, a chromatic aberration of magnification compensation has been provided for with respect to two particular wavelengths, e.g., the F line (blue) and the C line (red), there have existed the secondary spectra of chromatic aberrations of magnification with respect to the other wavelengths.

Then, in the case of such conventional fluorescent confocal microscope, as in the case in many instances, if the wavelengths of the excitation light and the fluorescent light fail to be coincident with the particular wavelengths subject to the chromatic aberrations of magnification compensation of the objective lens, chromatic aberrations of magnification appear at the excitation light wavelength and the fluorescent light wavelength.

In the case of the ordinary fluorescent microscope, such chromatic aberration of magnification do not present much problems since they merely change the magnification of a fluorescent image. In the case of the fluorescent confocal microscope, however, if there is the difference in chromatic aberration of magnification between the excitation light wavelength and the fluorescent light wavelength, the center of the fluorescent light spot deviates from the center of the pinhole so that the light quantity passed through the pinhole is decreased and the image becomes darker.

Since the chromatic aberration of magnification becomes increasingly large from the center of the visual field to the adjacent regions on the whole, even if the object (specimen) emits the same amount of fluorescent light in both the center and adjacent regions of the visual field, the image produced by the fluorescent confocal microscope becomes such that the image is darker in the adjacent regions than in the center of the visual field.

Particularly, there is a problem that if the diameter of the pinhole is decreased to obtain an optical cutting function and an excellent lateral resolution which are features of the fluorescent confocal microscope, the light quantity is decreased extremely in the adjacent regions of the visual field and only the center and its vicinity of the visual field are practically observed, thereby narrowing the visual field.

Moreover, if the center of the fluorescent light spot deviates from the center of the pinhole, the form of the detected light quantity distribution relative to the displacement of the specimen in the direction of the optical axis is changed and the reliability of the resulting image is deteriorated.

Further, where a fluorescent reagent (Indo-1) of a single excitation light wavelength and two fluorescent light wavelengths, a fluorescent reagent (Fura-2) of two excitation light wavelengths and a single fluorescent light wavelength or the like is used to make a quantitative measurement of ions or the like by a comparison in light quantity between the excitation light of the single wavelength and the fluorescent light of the two different wavelengths or a comparison in light quantity between the excitation light of the two different wavelengths and the fluorescent light of the single wavelength, there is a problem that if there is the difference in the magnitude of chromatic aberration of magnification between the two excitation wavelengths or the two fluorescent light wavelengths, the difference in the degree of decrease in light quantity between the two different excitation light wavelengths or fluorescent light wavelengths increases from the center to the adjacent regions of the visual field, thereby ruining the quantitativeness of the measurement.

SUMMARY OF THE INVENTION

The present invention has been made in view of the foregoing circumstances and it is the primary object of the present invention to provide a fluorescent confocal microscope capable of reducing the occurrence of chromatic aberration of magnification at the wavelengths of excitation light and fluorescent light to obtain an excellent optical cutting function and a satisfactory lateral resolution over a wide visual field and also capable of improving the accuracy of quantitative measurements which handle a plurality of excitation light wavelengths or fluorescent light wavelengths.

To accomplish the above object, in accordance with the present invention there is thus provided a fluorescent confocal microscope including a light source for producing an excitation light, an objective optical system for condensing the excitation light onto a specimen, scanning means (scanner mirrors in the embodiments) for scanning the surface of the specimen with the excitation light, and an intermediary optical system including a scanning optical system (a scanner optical system in the embodiments) arranged between the scanning means and the objective optical system, whereby the fluorescent light beam emitted from the specimen excited with the excitation light is detected through the objective optical system and the scanning optical system. Particularly, with a view to overcoming the foregoing problems, in accordance with the present invention the intermediary optical system including the scanning optical system is constructed to provide compensation for any chromatic aberration of magnification of the objective optical system for the wavelengths of the excitation light and the fluorescent light.

In accordance with the present invention, where the chromatic aberrations of magnification of the objective optical system are compensated for by the scanning optical system, it is desirable that the scanning optical system is composed of a negative lens group and a positive lens group arranged in this order from the scanning means side and that the pupil of the objective lens is relayed to the vicinity of the scanning means by the pupil projection lens of the objective optical system and the scanning optical system and also a pupil magnification $\beta_p$ satisfies the following expression $$|\beta_p| < 1$$

Further, in accordance with the present invention, where the chromatic aberration of magnification of the objective optical system is compensated for by a relay optical system which relays the image of the specimen, it is desirable to construct so that the pupil of the objective lens is relayed to the vicinity of the scanning means and also an imaging magnification $\beta$ of the relay optical system satisfies the following expression $$f_s f_o \cdot NA/(f_t r_s) \leq |\beta| < 1$$

(where $f_s$ is the focal distance of the scanning optical system, $f_o$ is the focal distance of the objective lens, NA is the numerical aperture of the objective lens, $f_t$ is the focal distance of the pupil projection lens, and $r_s$ is the scanning means effective radius in the pupil imaging plane).

With the fluorescent confocal microscope, the light used as the excitation light is light of a short wavelength such as a laser light and the fluorescent light to be detected is one which is long in wavelength as compared with the excitation light. As a result, this type of microscope must compensate for the chromatic aberration of magnification with respect to the two wavelengths which are greatly different from each other. In the case of the conventional microscope objective lens, however, no consideration is given to the chromatic aberration of magnification with respect to such a wide band of wavelengths other than the compensated wavelengths and also it is difficult to provide the compensation for such wide band by means of the objective optical system alone even if an attempt is made to compensate for the aberration.

Thus, in accordance with the present invention the intermediary optical system provided between the objective optical system and the scanning means is constructed so as to cancel the chromatic aberration of magnification of the objective optical system for the excitation light wavelength and the fluorescent light wavelengths, thereby reducing the chromatic aberration of magnification of the composite system of the objective optical system and the intermediary optical system on the whole.

As a result, the deviation caused between the centers of the fluorescent light spot and each pinhole due to the chromatic aberration of magnification of the objective optical system is reduced and the loss of the fluorescent light emitted from the focal plane so as to pass through the pinholes as a matter of course is reduced.

Still further, where the respective fluorescent light quantities for the plurality of excitation light wavelengths are compared or the light quantities of fluorescent light of the plurality of wavelengths emitted by the excitation light of the single wavelength are compared, in accordance with the present invention practically there is no difference in chromatic aberration of magnification between the excitation light beams relative to the fluorescent light beam or between the fluorescent light beams relative to the excitation light and therefore accurate quantitative measurements can be effected.

The above and other objects, features and advantages of the present invention will become more apparent from the following description of its preferred embodiments shown only for illustrative purposes without any intention of limitation when taken in conjunction with the accompanying drawings.

DETAILED DESCRIPTION OF THE EMBODIMENTS

A fluorescent confocal microscope according to a first embodiment of the present invention will be described first with reference to FIG. 1. The first embodiment is designed so that in an optical system for the case where a specimen is stained with a fluorescent reagent of a single excitation light wavelength and two fluorescent light wavelengths, the chromatic aberration of magnification of an objective optical system is compensated for by a scanning optical system.

Figure 1:
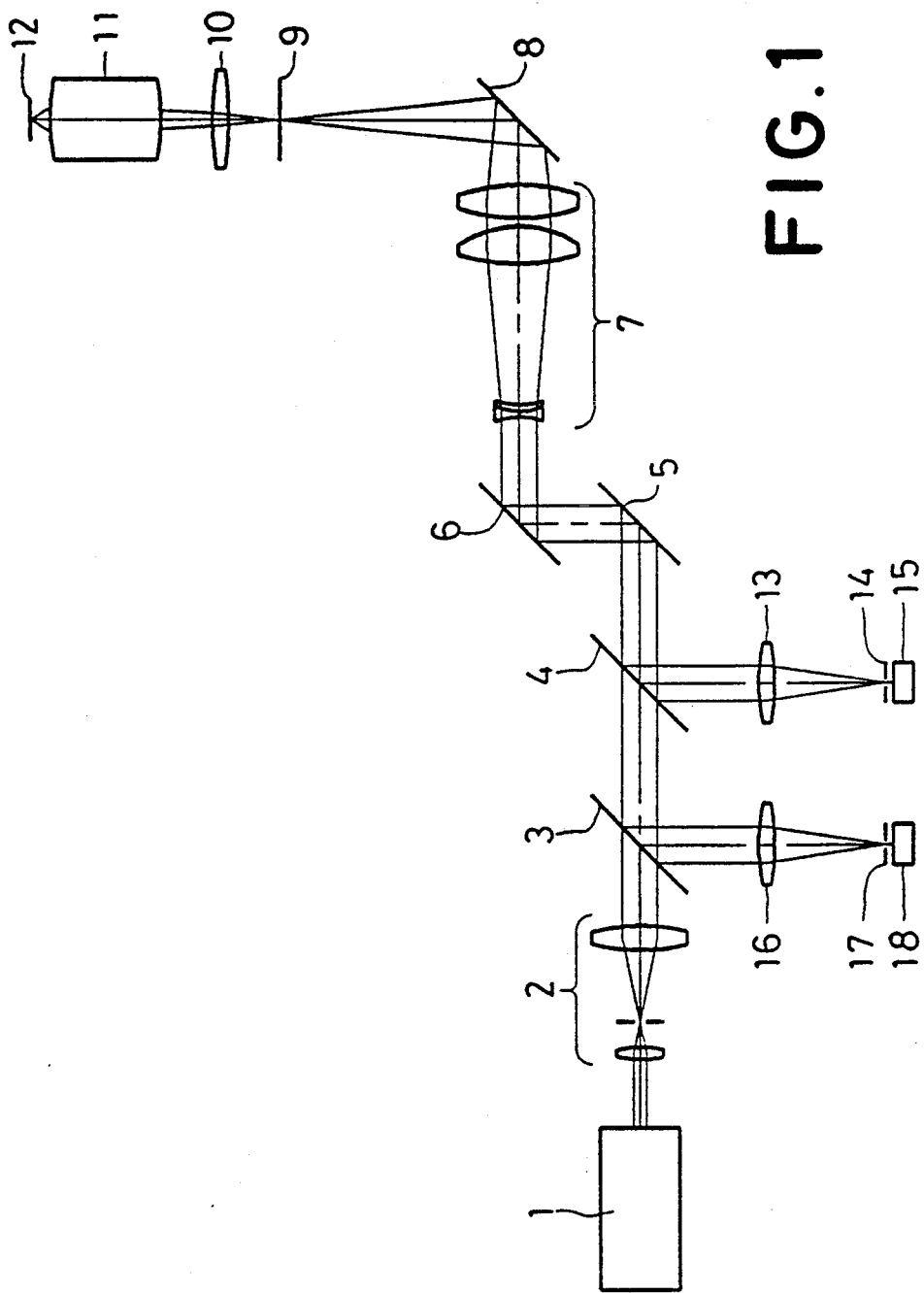
FIG. 1 is an optical path diagram showing the construction of principal parts of a fluorescent confocal microscope according to a first embodiment of the present invention.

In FIG. 1, the excitation light emitted from a laser light source 1 is converted by a beam expander 2 to a collimated light beam having a suitably expanded diameter which conforms with scanner mirrors 5 and 6 (scanning means) and it is then transmitted through dichroic mirrors 3 and 4 to enter the scanner mirrors 5 and 6. The scanner mirrors 5 and 6 have their axes of rotation arranged so as to cross each other at right angles so that if the axis of rotation of the mirror 5 is in the plane of the paper of FIG. 1, the axis of rotation of the mirror 6 lies in a direction perpendicular to the plane of the paper. The excitation light beam emitted through the scanner mirrors 5 and 6 enters a scanner optical system 7 (to be described in detail later) and it is then bent by a mirror 8 to focus a spot on a primary image plane 9. By causing each of the scanner mirrors 5 and 6 to make rotatory vibrations about its axis of rotation with a given angle, the laser spot is caused to make a two-dimensional movement on the primary image plane 9. It is to be noted that the mirror 8 following the scanner optical system 7 is provided for the purpose of making the arrangement of the optical system to be of the inverted type and it may be eliminated in the case of taking the form of any other arrangement.

The excitation light which has been condensed first on the primary image plane 9 is again condensed into a spot on a specimen surface 12 through a pupil projection lens 10 and an objective lens 11. On the specimen surface 12, as in the case of the primary image plane, the spot is moved in synchronism with the vibrations of the scanner mirrors 5 and 6, thereby effecting a two-dimensional scanning. While, in this embodiment, the objective optical system is formed by the pupil projection lens 10 and the objective lens 10, the pupil projection lens 10 is arranged so that it is combined with the scanner optical system 7 to project the pupil of the objective lens 11 to the vicinity of the scanner mirrors 5 and 6 (e.g., midway between the mirrors 5 and 6).

The laser spot excites the specimen surface 12 so that fluorescent light of two different wavelengths emitted by its fluorescent molecules are directed backward through the objective lens 11, the pupil projection lens 10, the scanner optical system 7 and the scanner mirrors 5 and 6, are respectively reflected, depending on their wavelengths, by dichroic mirror 3 and 4 and are respectively condensed on pinholes 14 and 17 by collector lenses 13 and 16, thereby causing only the fluorescent light passed through the pinholes 14 and 17 to be detected by photo detectors 15 and 18, respectively.

In the present embodiment, the scanner optical system 7 is of a retrofocus-type construction composed of a negative lens group and a positive lens group arranged in this order from the side of the scanner mirrors 5 and 6 and it is designed so that its chromatic aberration of magnification cancels the chromatic aberration of magnification of the objective optical system. As a result, the fluorescent light emitted from the specimen surface 12 and returned to the scanner mirrors 5 and 6 are emitted from the scanner mirror 5 at the same angle as at the time of incidence even during the scanning. Thus, the fluorescent light form a spot at the same position of each of the pinholes 14 and 17 at all times.

As a result, there is no longer any decrease in the light quantity in the adjacent regions of the visual field due to the chromatic aberration of magnification, thereby ensuring the quantitativeness of a measurement effected by a comparison in light quantity between the fluorescent light of the two different wavelengths (in FIG. 1, a comparison between the light quantities detected by the ditectors 15 and 16, respectively).

Figure 3:
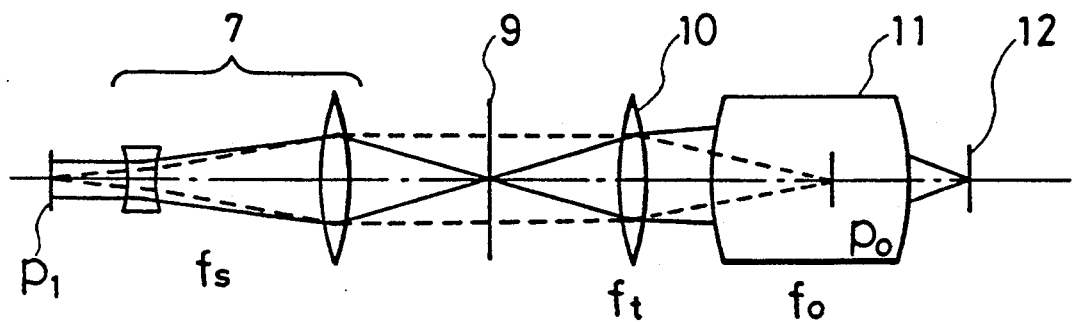
FIG. 3 is a principal optical path diagram for explaining the desired design conditions for the first embodiment.

Next, the design conditions of the optical systems in the first embodiment shown in FIG. 1 will be described with reference to FIG. 3. In FIG. 3, the solid lines represent an object imaging and the dotted lines represent a pupil imaging. The image of the object surface (specimen surface) 12 is focused on the primary image plane 9 by the objective lens 11 and the pupil projection lens 10 and the pupil $P_o$ of the objective lens 10 is imaged on a primary pupil plane $P_1$ located midway between the scanner mirrors 5 and 6 through the pupil projection lens 10 and the scanner optical system 7.

Generally, fluorescent light is small in light quantity and therefore it is desirable to construct so that with a view to illuminating to the full extent of the opening of the objective lens 11 so as to form the excitation light spot of as small as possible on the specimen surface 12 and also utilizing the fluorescent light emanating from the specimen surface 12 without any waste, the pupil of the objective lens 11 is relayed to the vicinity of the scanner mirrors 5 and 6 as shown in FIG. 3.

At this time, the radius $r_{p\,1}$ of the primary pupil $P_1$ is given by the following equation (1)

$$r_{p\,1} = (f_s/f_t) \cdot rP_o = f_s f_o \cdot NA/f_t \tag{1}$$

where $r_{p\,o}$ is the pupil radius of the objective lens 11, $f_s$ the focal distance of the scanner optical system 7, $f_t$ the focal distance of the pupil projection lens 10, $f_o$ the focal distance of the objective lens 11 and NA the object-side numerical aperture of the objective lens 11.

Here, if $r_s$ represents the effective radius of the scanner mirrors 5 and 6 at the primary pupil plane 9, in order to prevent the beam from being eclipsed by the scanner mirrors 5 and 6, it is essential that $r_s \geq r_{p\,1}$. Therefore, equation (3) is derived from the following equation (2). Here, $\beta_p$ is the pupil magnification $(= -f_s/f_t)$.

$$r_s \geq r_{p\,1} = f_s f_o \cdot NA/f_t \tag{2}$$

$$|\beta_p| = f_s/f_t \leq r_s/(f_o \cdot NA) \tag{3}$$

In equation (3), there is an upper limitation to the effective radius $r_s$ of the scanner mirrors 5 and 6; particularly, where the mirrors are vibrated mechanically, the effective radius is decreased with increase in the speed. Thus, the pupil magnification $\beta_p$ should preferably be set so as to satisfy the following equation (4)

$$|\beta_p| \leq 1 \tag{4}$$

In addition, it is desirable that in order to provide compensation for the chromatic aberration of magnification of the objective lens 11, the scanner optical system 7 should preferably be composed of two lens groups as in the case of the first embodiment. Since the scanner optical system 7 on the whole has a positive power, three kinds of combinations, i.e., a positive lens group-positive lens group, a positive lens group-negative lens group and a negative lens group—a positive lens group as looked from the side of the scanner mirrors 5 and 6 may be conceived. Of these combinations, the combination of a positive lens group—a positive lens group may not necessarily be suited for the reduction of the size of the system since its whole length is long.

Figure 5:
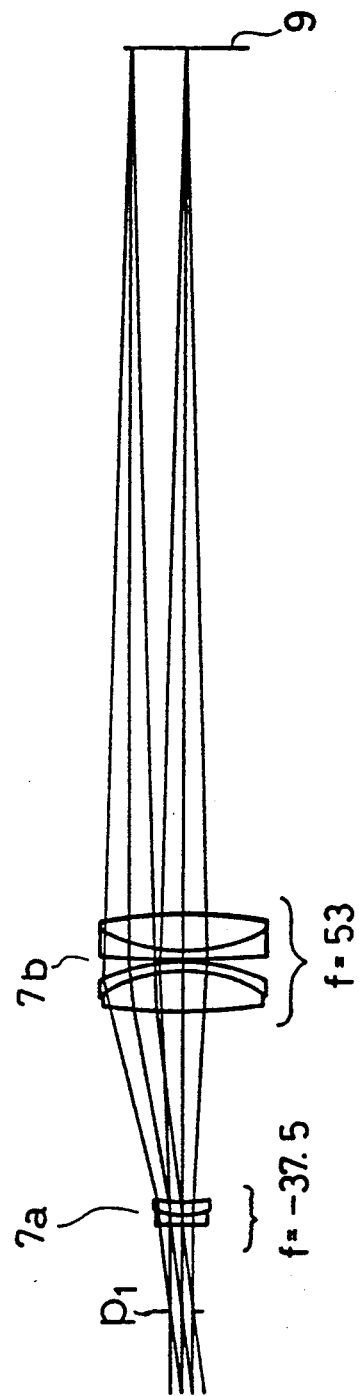
FIG. 5 is an enlarged optical path diagram showing the case where the chromatic aberration of magnification compensation is effected by a retrofocus-type scanner optical system.
Figure 6:
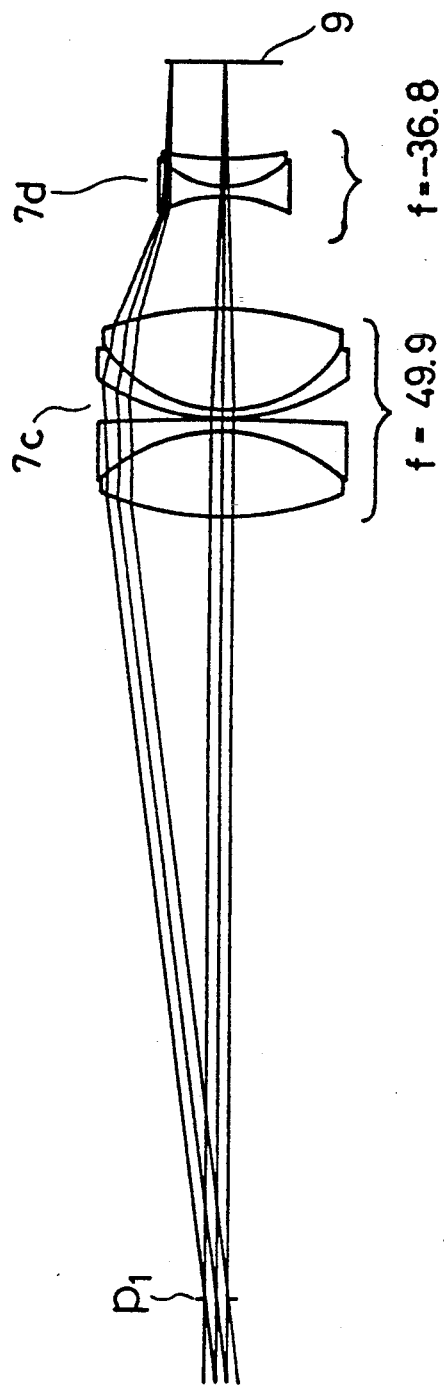
FIG. 6 is an enlarged optical path diagram showing the case where the chromatic aberration of magnification compensation is effected by a tele-type scanner optical system.

Also, as regards the two combinations of a positive lens group—a negative lens group and a negative lens group—a positive lens group, let us design the lenses of the scanner optical system 7 for the respective cases and compare them on the assumption that the same kind of glass is used and the aberration compensation is effected under the same conditions. FIGS. 5 and 6 show respectively the optical path diagrams (the marginal rays along the axis and the rays of the maximum image height) of the scanner optical system 7 corresponding to the respective cases. FIG. 5 shows the construction of a retrofocus type (or an inversetelephototype) comprising a negative lens group 7a (f= −37.5) and a positive lens group 7b (f=53) in this order from the side of the scanner mirrors 5 and 6, and FIG. 6 shows the construction of a tele-type (or telephoto-type) comprising a positive lens group 7c (f=49.9) and a negative lens group 7d (f= −36.8). In either of the cases, the chromatic aberration of magnification is compensated for to about the same degree. It is to be noted that in the FIGS. numeral 9 corresponds to the primary image plane 9 of FIG. 1.

As will be seen from a comparison between FIGS. 5 and 6, the tele-type construction (FIG. 6) is not a rational construction in that the beam from the scanner mirrors in strongly bent inwardly by the first positive lens group and it is then bent strongly outwardly by the following negative lens group. As a result, in the case of the tele-type construction of FIG. 6, the aberrations other than the chromatic aberration of magnification are deteriorated as compared with the retrofocus-type construction of FIG. 5. It will also be seen that in the tele-type construction the outer diameter of the optical system on the whole is increased and also the thickness of the positive lens group 7c is increased as compared with the retrofocus-type construction. Thus, the scanner optical system 7 should preferably be of the retrofocus-type construction which causes the beam to follow the natural optical path and which makes the optical system on the whole compact.

Figure 2:
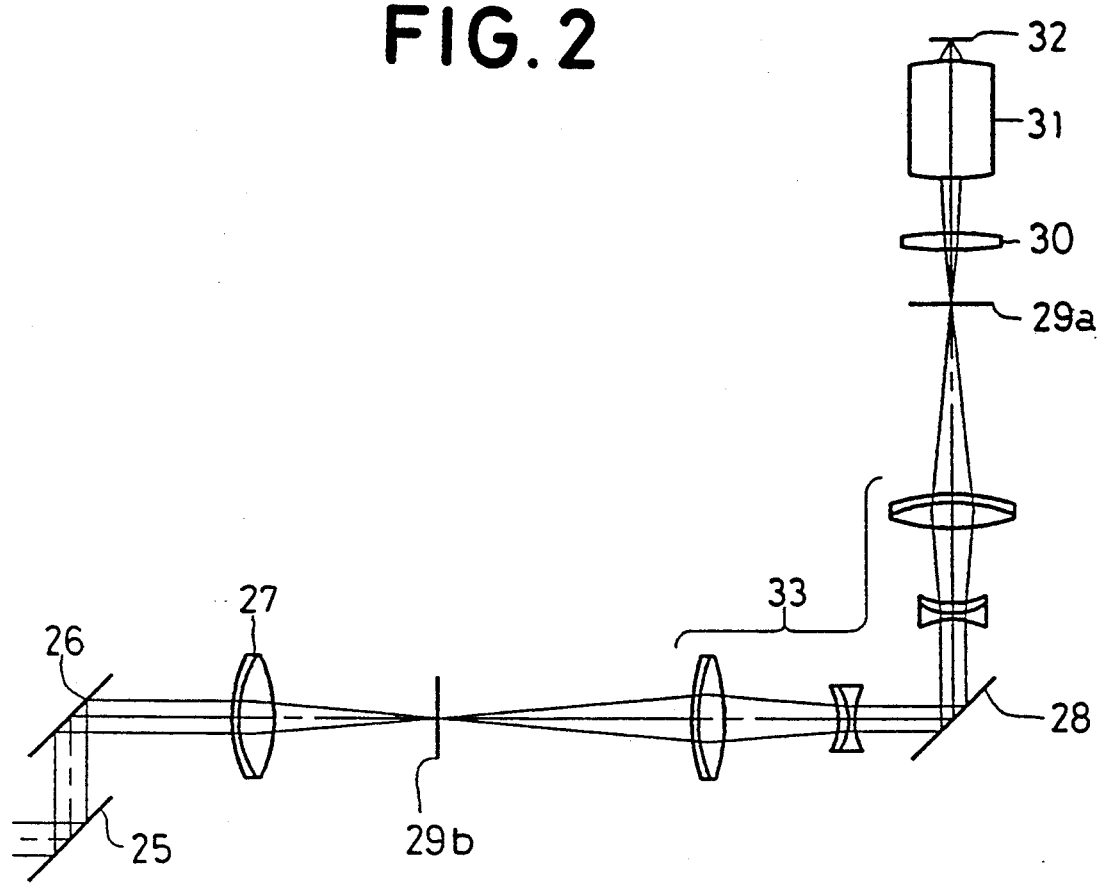
FIG. 2 is an optical path diagram showing the construction of principal parts of a fluorescent confocal microscope according to a second embodiment of the present invention.

Referring now to FIG. 2, there is illustrated an optical path diagram showing the construction of principal parts of a fluorescent confocal microscope according to a second embodiment of the present invention. In this embodiment, the chromatic aberration of magnification of an objective optical system is compensated for by a relay optical system in an optical system for a case where a specimen is observed by staining it with a fluorescent reagent of a single excitation light wavelength and two fluorescent light wavelengths. It is to be noted that since the arrangement of a laser light source, an expander, dichroic mirrors, scanner mirrors, collector lenses, pinholes and photo detectors is the same as in the case of FIG. 1, FIG. 2 shows only the construction between scanner mirrors 25 and 26 and a specimen surface 32.

In FIG. 2, the excitation light emitted through the scanner mirrors 25 and 26 is condensed by a scanner lens 27 which is well compensated for the chromatic aberration of magnification of its own and a light spot is formed on a secondary image plane 29b. The excitation light passed through the secondary image plane 29b enters into a relay optical system 33 so that it bent by a mirror 28 to be focused again on a primary image plane 29a. The excitation light passed through the primary image plane 29a is condensed through a pupil projection lens 30 and an objective lens 31 to form a light spot on the specimen surface 32. At this time, as in the case of the first embodiment, the scanner mirrors 25 and 26 are vibrated so that the specimen surface 32 is two-dimensionally scanned by the excitation light spot. It is to be noted that in the Figure the mirror 28 is provided to make the arrangement of the optical system to be of the inverted type and it is not necessarily needed.

Then, fluorescent light of two different wavelengths is emitted from the fluorescent molecules of the specimen surface 32 excited by the excitation light spot so that the fluorescent light is directed backward through the objective lens 31, the pupil projection lens 30, the relay optical system 33 and the scanner mirrors 25 and 26 and then, as in the case of FIG. 1, it is reflected by the dichroic mirrors, condensed on the pinholes through the collectors and detected by the photo detectors.

With the present embodiment, it is designed so that the chromatic aberration of magnification of the relay optical system 33 cancels the chromatic aberration of magnification of the objective lens 11 and thus the fluorescent light emitted from the specimen surface 32 and returned to the scanner mirrors 25 and 26 is emitted from the scanner mirror 5 at the same angle as at the time of incidence even during the operation of the scanner mirrors 5 and 6. As a result, the fluorescent light always forms a spot at the same position of each of the pinholes so that in the like manner as the first embodiment, there is no decrease in the light quantity in the adjacent regions of the visual field due to the chromatic aberration of magnification and the quantitativeness of a measurement effected by a comparison in light quantity between the fluorescent light of the two different wavelengths is ensured.

Where the construction of relaying the image of the specimen surface 32 is employed and the chromatic aberration of magnification is compensated by the relay optical system 33 as in the second embodiment shown in FIG. 2, the degree of freedom in the designing of the optical systems is increased, although the optical path is increased as compared with the case of the first embodiment shown in FIG. 1. In the case of the second embodiment, by setting the magnification of the relay optical system 33 to a suitable reduction magnification, the relay optical system 33 can be easily caused to have a chromatic aberration of magnification tending to cancel the chromatic aberration of magnification of the objective optical system.

Figure 4:
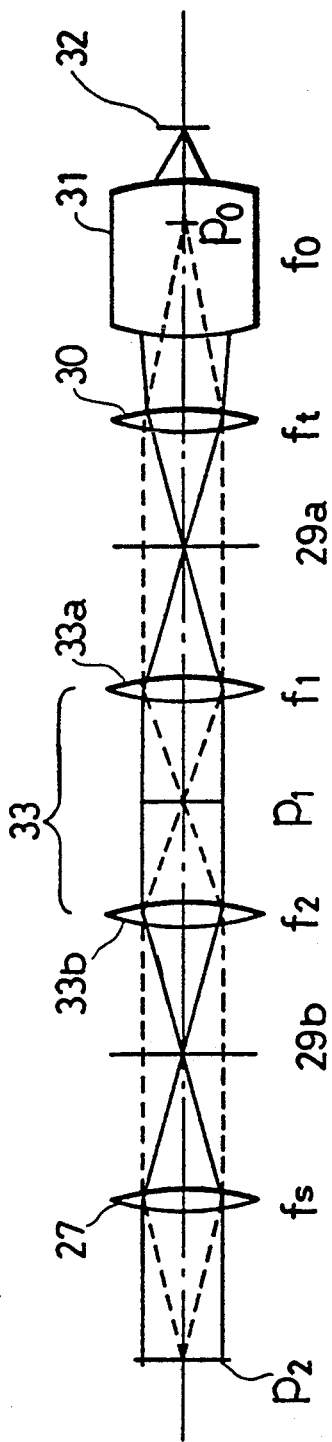
FIG. 4 is a principal optical path diagram for explaining the desired design conditions for the second embodiment.

Next, the design conditions of the optical systems in the second embodiment of FIG. 2 will be described with reference to FIG. 4. In FIG. 4, the solid lines represent an object imaging and the dotted lines represent a pupil imaging. The image of the object surface (specimen surface) 32 is focused on the primary image plane 29a and it is then focused again on the secondary image plane 29b by the relay optical system 33. On the other hand, the pupil $P_0$ of the objective lens 31 is imaged on a primary pupil plane $P_1$ by the pupil projection lens 30 and a first lens 33a of the relay optical system 33 and it is again imaged by a second lens 33b of the relay optical system 33 and the scanner mirror 27 on a secondary pupil plane $P_2$ arranged midway between the scanner mirrors 25 and 26.

At this time, if $f_s$ is the focal distance of the scanner lens 27, $f_1$ and $f_2$ are respectively the focal distances of the first and second lenses 33a and 33b of the relay optical system 33, $f_t$ is the focal distance of the pupil projection lens 30, $f_o$ is the focal distance of the objective lens 31, NA is the object-side numerical aperture of the objective lens 31, $r_{p0} (=f_o \cdot NA)$ is the pupil radius of the objective lens 31 and $r_{p1}$ is the primary pupil radius, the radius $r_{p2}$ of the secondary pupil $P_2$ is given by the following equation (5)

$$r_{p2} = (f_s/f_1) \cdot r_{p1} \qquad (5)$$
$$= (f_s/f_2)(f_1/f_t) \cdot r_{p0}$$
$$= (f_1 \cdot f_s \cdot f_o \cdot NA/(f_2 \cdot f_t)$$

Then, if $r_s$ represents the effective radius of the scanner mirrors 25 and 26 at the secondary pupil plane $P_2$, in order to prevent the marginal portions of the beam from being eclipsed by the scanner mirrors 25 and 26, there must be a relation $r_s \geq r_{p2}$. Therefore, equation (7) is derived from the following equation (6)

$$r_s \geq r_{p2} = f_1 \cdot f_s \cdot f_o \cdot NA/(f_2 \cdot f_t) \qquad (6)$$

$$|\beta| = f_2/f_1 \geq f_3 \cdot f_o \cdot NA/(f_t \cdot r_s) \qquad (7)$$

where $\beta$ represents the magnification ($= -f_2/f_1$) of the relay optical system.

In equation (7), there is an upper limitation to the effective radius $r_s$ of the scanner mirrors 25 and 26, and also interference is caused between the scanner mirrors 25 and 26 and the scanner lens 27 (the rotation of the mirrors causes them to strike against the lens) which are arranged in the vicinity of the secondary pupil plane $P_2$ if the focal distance $f_s$ of the scanner lens 27 is excessively short thereby placing a lower limitation to the magnification $\beta_p$ of the relay optical system 33 as given by equation (7).

Further, where the chromatic aberration of magnification of the objective optical system is compensated by the relay optical system 33, the magnification of the relay optical system 33 should preferably be given as $|\beta|<1$. Therefore, it is desirable that the magnification $\beta$ of the relay optical system 33 satisfies the conditions of the following equation (8)

$$f_s f_o \cdot NA/(f_r r_s) < |\beta| < 1 \tag{8}$$

While, in the above-described embodiments, the fluorescent reagent of a single excitation light wavelength and two fluorescent light wavelengths is used, the present invention is not limited thereto and the invention is applicable to cases where a fluorescent reagent of a single excitation light wavelength and a single fluorescent light wavelength, a fluorescent reagent of two excitation light wavelengths and a single fluorescent light wavelengths and other fluorescent reagents are used.

Further, while the chromatic aberration of magnification of the objective optical system is compensated for by the scanner optical system in the first embodiment and by the relay optical system in the second embodiment, it is needless to say that the scanner optical system and the relay optical system can be combined to provide compensation for the chromatic aberration of magnification of the objective optical system.

From the foregoing description it will be seen that in accordance with the present invention the chromatic aberration of magnification of the objective optical system for the wavelengths of the excitation light and the fluorescent light are compensated for by the intermediate optical system arranged between the objective optical system and the scanning means and therefore the chromatic aberration of magnification of the composite system on the whole of the objective optical system and the intermediate optical system is reduced. As a result, the deviation between the center of the fluorescent light spot and the center of each pinhole is reduced and an excellent optical cutting function and a satisfactory lateral resolution are obtainable over a wide extent of the visual field.

Further, the form of the detected light quantity response to the movement of the specimen in the direction of the optical axis approaches the theoretical value and the reliability of the resulting image is also improved.

Still further, when performing a quantitative measurement using a plurality of excitation light beams or fluorescent light beams of different wavelengths, the quantitativeness of the measurement is ensured over a wide extent of the visual field.

What is claimed is:

1. A fluorescent confocal microscope comprising:
    a light source for producing excitation light;
    an objective optical system for condensing said excitation light on a specimen;
    scanning means for scanning a surface of said specimen with said excitation light;
    an intermediary optical system including a scanning optical system arranged between said scanning means and said objective optical system and constructed to provide compensation for chromatic aberration of magnification of said objective optical system for wavelengths of said excitation light and said fluorescent light; and
    fluorescent light detecting means for detecting fluorescent light emitted from said specimen excited by said excitation light and passed through said objective optical system and said scanning optical system.

2. A fluorescent confocal microscope according to claim 1, wherein said scanning optical system has a retrofocus-type construction including a negative lens group and a positive lens group arranged in this order from said scanning means side.

3. A fluorescent confocal microscope according to claim 2, wherein said objective optical system includes an objective lens and a pupil projection lens, wherein a pupil of said objective lens is relayed to the vicinity of said scanning means by said pupil projection lens and said scanning optical system, and wherein a pupil magnification $\beta_p$ is selected to satisfy an expression $|\beta_p|<1$.

4. A fluorescent confocal microscope according to claim 1, wherein said intermediary optical system includes a relay optical system for relaying an image of said specimen formed by said objective optical system.

5. A fluorescent confocal microscope according to claim 4, wherein said objective optical system includes an objective lens and a pupil projection lens, wherein a pupil of said objective lens is relayed to the vicinity of said scanning means, and wherein an imaging magnification $\beta$ of said relay optical system is selected to satisfy an expression $f_s f_o \cdot NA/(f_r r_s) \leq |\beta| < 1$ (where $f_s$ is a focal distance of said scanning optical system, $f_o$ is a focal distance of said objective lens, NA is a numerical aperture of said objective lens, $f_r$ is a focal distance of said pupil projection lens, and $r_s$ is an effective radius of said scanning means at a pupil imaging plane).

* * * * *